US010984397B2

(12) United States Patent
Kassaei

(10) Patent No.: US 10,984,397 B2
(45) Date of Patent: Apr. 20, 2021

(54) APPLICATION RECOMMENDATION ENGINE

(75) Inventor: Farhang Kassaei, San Jose, CA (US)

(73) Assignee: eBay Inc., San Jose, CA (US)

(*) Notice: Subject to any disclaimer, the term of this patent is extended or adjusted under 35 U.S.C. 154(b) by 929 days.

(21) Appl. No.: 12/416,051

(22) Filed: Mar. 31, 2009

(65) Prior Publication Data

US 2010/0250337 A1 Sep. 30, 2010

(51) Int. Cl.
*G06Q 20/10* (2012.01)
*G06Q 30/08* (2012.01)
*G06Q 30/02* (2012.01)
*G06Q 30/06* (2012.01)

(52) U.S. Cl.
CPC ....... *G06Q 20/108* (2013.01); *G06Q 30/0269* (2013.01); *G06Q 30/0277* (2013.01); *G06Q 30/0631* (2013.01); *G06Q 30/08* (2013.01)

(58) Field of Classification Search
CPC .......................................... G06Q 10/00–50/00
USPC .................................. 705/7.11–7.42, 50–77
See application file for complete search history.

(56) References Cited

U.S. PATENT DOCUMENTS

| | | | | |
|---|---|---|---|---|
| 6,070,149 A * | 5/2000 | Tavor | | G06Q 30/02 705/26.7 |
| 6,738,750 B2 * | 5/2004 | Stone | | G06Q 10/00 235/384 |
| 6,839,690 B1 * | 1/2005 | Foth | | G06Q 20/02 705/26.41 |
| 7,069,271 B1 * | 6/2006 | Fadel | | G06Q 10/00 705/26.62 |
| 7,165,041 B1 * | 1/2007 | Guheen | | G06Q 30/04 705/26.1 |
| 7,490,056 B2 * | 2/2009 | Nash | | G06Q 30/0617 705/26.43 |

(Continued)

FOREIGN PATENT DOCUMENTS

WO WO-2009018347 A1 2/2009
WO WO-2010114903 A1 10/2010

OTHER PUBLICATIONS

"International Application Serial No. PCT/US2010/029418, International Preliminary Report on Patentability dated Oct. 13, 2011", 8 pgs.

(Continued)

*Primary Examiner* — Alan S Miller
(74) *Attorney, Agent, or Firm* — Schwegman Lundberg & Woessner, P.A.

(57) ABSTRACT

A computed-implemented method and system for recommending business applications on a network-based marketplace are described. A user's listings, representing items for sale on the marketplace, are harvested to calculate segmentation data and metrics that form a user profile. The user profile is compared with other similar users who have subscribed to various applications, and the impact those applications have had on the metrics of the similar users is calculated in order to determine what impact the applications will have on the user in question. The impact, combined with user preferences, is used to suggest appropriate applications, which are displayed to the user within the marketplace. If the user selects one of the applications, the application is added to the user's profile and relevant listings are updated with the new application.

18 Claims, 13 Drawing Sheets

(56) References Cited

U.S. PATENT DOCUMENTS

| | | | | |
|---|---|---|---|---|
| 7,739,148 B2* | 6/2010 | Suzuki | G06Q 10/06393 | 705/7.39 |
| 7,769,640 B2* | 8/2010 | Klenske | G06Q 40/00 | 705/26.3 |
| 7,899,712 B2* | 3/2011 | May | G06Q 20/04 | 705/26.1 |
| 8,050,976 B2* | 11/2011 | Staib | G06Q 30/0283 | 705/26.1 |
| 8,050,998 B2* | 11/2011 | Bolivar | G06Q 30/02 | 705/37 |
| 8,055,548 B2* | 11/2011 | Staib | G06Q 30/0601 | 705/26.1 |
| 8,578,275 B2* | 11/2013 | Brolley | G06Q 30/0282 | 715/738 |
| 8,595,626 B2* | 11/2013 | Brolley | G06Q 30/0282 | 715/738 |
| 8,776,219 B2* | 7/2014 | Bisso | G06F 21/56 | 726/22 |
| 2002/0143819 A1* | 10/2002 | Han | G06F 16/958 | 715/237 |
| 2003/0014346 A1* | 1/2003 | Zhang | G06Q 30/08 | 705/37 |
| 2005/0038733 A1* | 2/2005 | Foster | G06Q 40/12 | 705/37 |
| 2005/0197909 A1* | 9/2005 | Klenske | G06Q 10/0639 | 705/7.29 |
| 2005/0197946 A1* | 9/2005 | Williams | G06Q 30/0247 | 705/36 R |
| 2005/0203804 A1* | 9/2005 | Suzuki | G06Q 10/06393 | 705/14.46 |
| 2005/0228722 A1* | 10/2005 | Embree | G06Q 30/0282 | 705/347 |
| 2006/0095431 A1* | 5/2006 | Nash | G06Q 30/0633 | |
| 2006/0106665 A1* | 5/2006 | Kumar | G06Q 30/0201 | 705/7.29 |
| 2007/0219857 A1* | 9/2007 | Seymour | G06Q 30/0277 | 705/14.73 |
| 2007/0299743 A1* | 12/2007 | Staib | G06Q 30/0204 | 705/7.33 |
| 2008/0015925 A1* | 1/2008 | Sundaresan | G06Q 30/01 | 705/7.11 |
| 2008/0086346 A1* | 4/2008 | Kossack | G06Q 30/08 | 705/7.28 |
| 2008/0147566 A1* | 6/2008 | Malik | G06Q 30/08 | 705/36 R |
| 2008/0242274 A1* | 10/2008 | Swanburg | G06Q 30/00 | 455/414.1 |
| 2009/0099940 A1* | 4/2009 | Frederick | G06Q 30/0283 | 705/26.4 |
| 2010/0125433 A1* | 5/2010 | Jordan | H04M 3/5233 | 702/155 |

OTHER PUBLICATIONS

"International Application Serial No. PCT/US2010/029418, Search Report dated Jun. 1, 2010", 9.

"International Application Serial No. PCT/US2010/029418, Written Opinion dated Jun. 1, 2010", 9.

"European Application Serial No. 10759345.1, Extended European Search Report dated Nov. 12, 2013", 7 pgs.

"European Application Serial No. 10759345.1, Office Action dated Nov. 8, 2011", 2 pgs.

"European Application Serial No. 10759345.1, Office Action dated Nov. 29, 2013", 1 pg.

"European Application Serial No. 10759345.1, Response filed Dec. 13, 2011", 11 pgs.

* cited by examiner

1200

| TERAPEAK MARKETPLACE RESEARCH | CONGRATULATIONS!<br>YOU HAVE SOLD 10,000 ITEMS. READY TO IMPROVE EVEN MORE? ADD TERAPEAK 5.0 TO SELLING MANAGER PRO.<br>LEARN MORE<br><br>WITH TERAPEAK 5.0 YOU CAN:<br>- GET UP TO DATE INFORMATION ABOUT THE VALUE OF YOUR INVENTORY<br>- INCREASE YOUR SALES<br>- BOOST YOUR PROFITS |
|---|---|

*FIG. 12*

APPLICATION RECOMMENDATION ENGINE

TECHNICAL FIELD

This application relates to the field of online commerce and, in one exemplary embodiment, to methods and systems of recommending software to users engaged in online commerce.

BACKGROUND

With the widespread acceptance of the Internet as a ubiquitous, interactive communication and interaction platform, online commerce conducted over the Internet has become commonplace in a variety of business environments, including auctions and fixed price item sales. A number of online marketplaces are utilized by merchants as an important, if not a primary, distribution channel for products. These "power sellers" typically list a large number of items to be sold or auctioned each day.

In order to manage a high volume of sales, power sellers rely on marketplace and payment applications. Some of these applications are provided by the marketplace itself, whereas others are written and sold by third party software developers. In order to discover these applications, especially third party ones, sellers typically have to search the Internet for them. Also, application writers must advertise their programs to make them easier to locate. As a result, sellers may not be aware of applications that could improve their ability to sell items, and they may not know which available applications will best meet their needs.

BRIEF DESCRIPTION OF DRAWINGS

Embodiments of the present invention are illustrated by way of example, and not limitation, in the figures of the accompanying drawings, in which like reference numbers indicate similar elements.

FIG. 12 is an image of an application recommended to a user within a user interface in an example embodiment.

DETAILED DESCRIPTION

Figure 1:
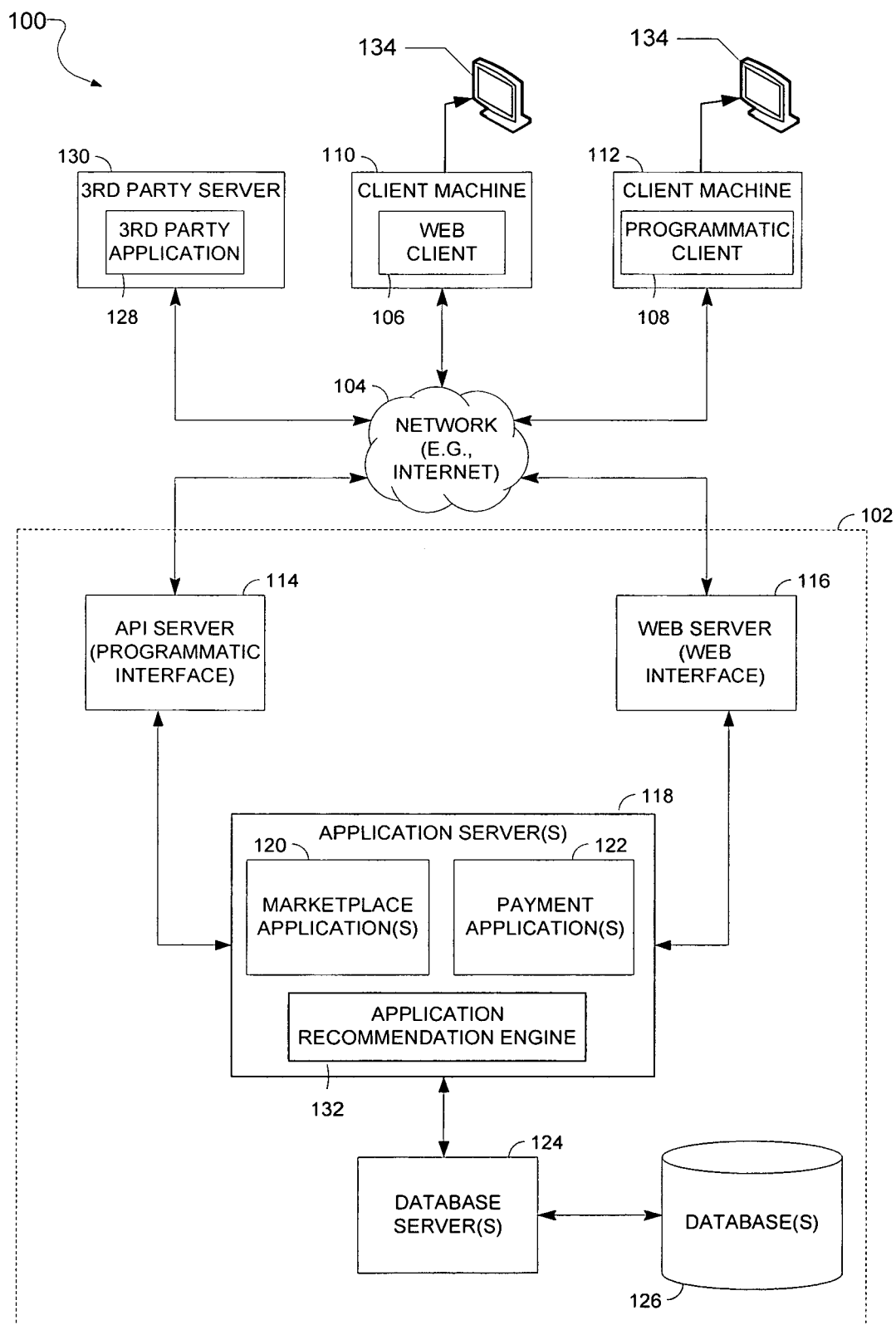
FIG. 1 is a network diagram depicting a client-server system, within which one example embodiment of an application recommendation engine may be deployed.

In the following description, for purposes of explanation, numerous specific details are set forth in order to provide a thorough understanding of some example embodiments. It will be evident, however, to one skilled in the art that the present invention may be practiced without these specific details. Further, well-known instruction instances, protocols, structures, and techniques have not been shown in detail.

Some example embodiments enable business applications designed to improve the effectiveness of selling items on a network-based trading environment to be recommended to appropriate sellers. Sellers are profiled based on the type and volume of items they sell in addition to detailed sales metrics. Their sales metrics are tracked for periods in which the sellers use specific applications in order to determine any gains that a particular application has on that type of seller. To recommend an application to a user, the user's profile is compared to the database of sellers to find similar profiles, and applications which best meet the user's needs are recommended.

In one example embodiment, a profile module calculates metrics from listings related to a specific user in order to create a sales profile of the user. An impact module assesses an impact on the calculated metrics by a number of applications, and a recommendation module suggests at least one of the applications based on the assessed impacts. A display module graphically displays the chosen application(s) to the user on a display device, and an update module updates a relevant portion of the user's listings using the application(s) chosen by the user.

According to some example embodiments, assessing the impact of an application on one of the metrics involves comparing sales profiles of sellers who have used the application to the user sales profile in order to discover which sellers have profiles similar to those of the user. Next, a prior sales metric is calculated for a first set of listings that were created prior to the use of the application, and an updated sales metric is calculated for a second set of listings created during the use of the application. The first and second sets of listings are compared with one another to assess the impact that the application had on the sales metric.

In one example embodiment, the user sales profile includes user sales data, which includes listing categories, listing keywords, application subscriptions, and a volume of sales. The metrics comprise at least one of profit margins, an average selling price, Detailed Seller Ratings (DSRs) and feedback, inventory turnover rate, accuracy of listings, communication with customers, average time to delivery, or shipping charges.

In some example embodiments, the listings consist of sales on a network-based marketplace and the applications are business applications designed to improve the effectiveness of selling items on a network-based trading environment.

Additionally, in an example embodiment, the recommendation module may rank and recommend applications based on application ratings or user preferences.

The application recommendation engine connects a user to applications using context-sensitive user profile data. By assessing the impact that various applications have had on other sellers with a profile similar to the user's profile, appropriate applications can be recommended to the user that are most relevant to the user's needs.

Further details regarding the various example embodiments described above will now be discussed with reference to the figures accompanying the present specification.

Platform Architecture

FIG. 1 is a network diagram depicting a client-server system 100, within which one example embodiment of an application recommendation engine 132 may be deployed.

A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112. The client machines 110 and 112 have an associated display device 134 (e.g., a monitor) for viewing data.

An Application Program Interface (API) server 114 and a web server 116 are coupled to, and provide programmatic and web interfaces respectively to, one or more application servers 118. The application servers 118 host one or more marketplace applications 120, payment applications 122, and the application recommendation engine 132. The application servers 118 are, in turn, shown to be coupled to one or more database servers 124 that facilitate access to one or more databases 126.

The one or more marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace applications 120 and payment applications 122 are shown in FIG. 1 to both form part of the networked system 102, it will be appreciated that, in alternative embodiments, the payment applications 122 may form part of a payment service that is separate and distinct from the networked system 102.

Further, while the client-server system 100 shown in FIG. 1 employs a client-server architecture, the present invention is, of course, not limited to such an architecture, and could equally well find application in a distributed, or peer-to-peer, architecture system, for example. The various marketplace 120 and payment 122 applications could also be implemented as standalone software programs operating under separate hardware platforms, which do not necessarily have networking capabilities.

The web client 106 accesses the various marketplace 120 and payment applications 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Marketplace Applications

Figure 2:
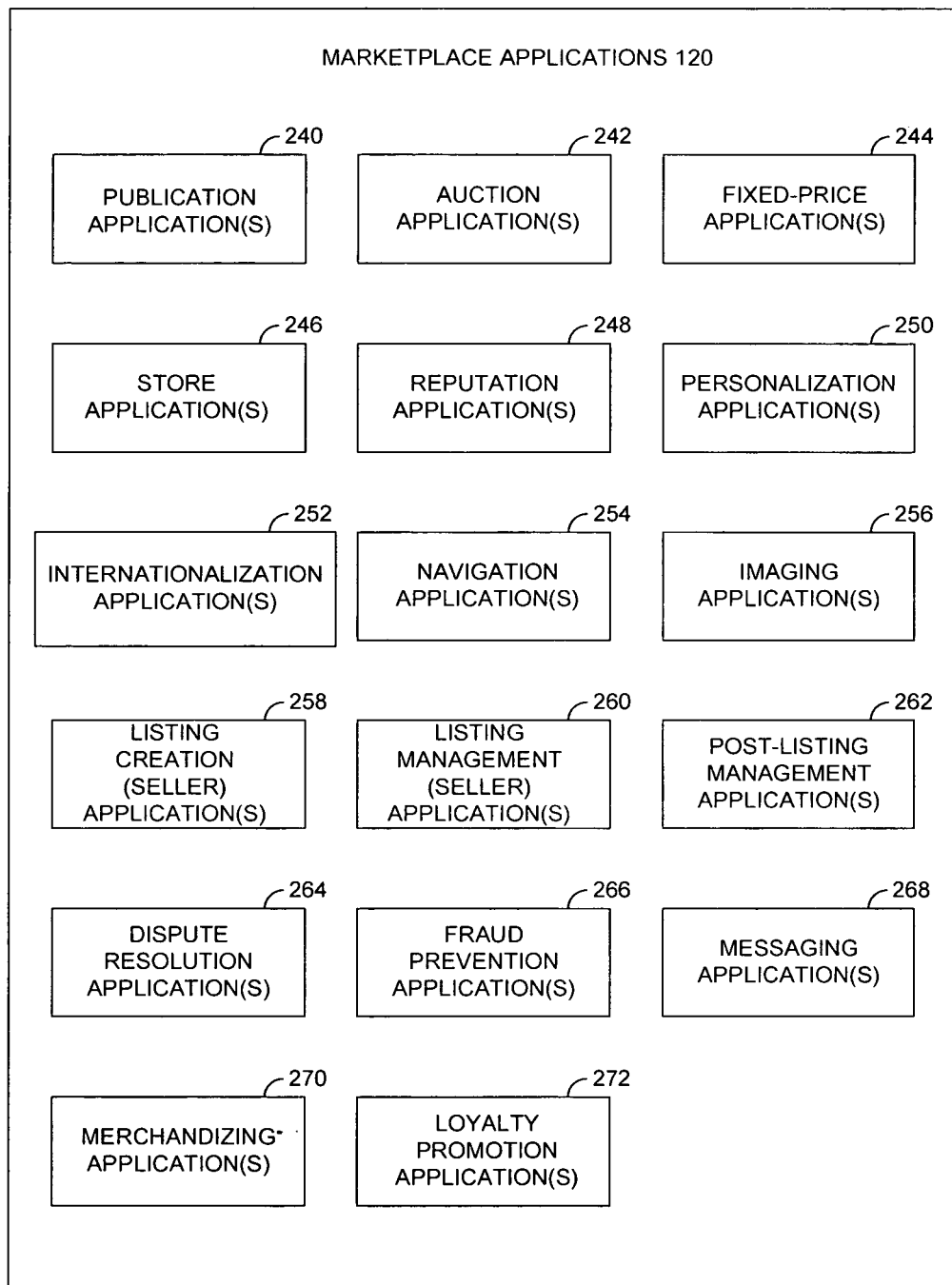
FIG. 2 is a block diagram illustrating multiple applications that, in one example embodiment, are provided as part of the networked system.

FIG. 2 is a block diagram illustrating multiple applications that, in one example embodiment, are provided as the marketplace applications 120 of the networked system 102 (see FIG. 1).

The one or more marketplace applications 120 may be hosted on dedicated or shared server machines (not shown) that are communicatively coupled to enable communications between the server machines. The applications themselves are communicatively coupled (e.g., via appropriate interfaces), either directly or indirectly, to each other and to various data sources, so as to allow information to be passed between the applications or so as to allow the applications to share and access common data. The applications may furthermore access the one or more databases 126 via the one or more database servers 124, both shown in FIG. 1.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 240 and one or more auction applications 242 which support auction-format listing and price setting mechanisms (e.g., English, Dutch, Vickrey, Chinese, Double, Reverse auctions, etc. known independently in the art). The various auction applications 242 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 244 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 246 allow a seller to group listings within a "virtual" store, which may be branded and otherwise personalized by and for the seller. Such a virtual store may also offer promotions, incentives, and features that are specific and personalized to a relevant seller.

Reputation applications 248 allow users that transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 248 allow a user, for example through feedback provided by one or more other transaction partners, to establish a reputation within the networked system 102 over time. Other potential trading partners may then reference such a reputation for the purposes of assessing credibility and trustworthiness.

Personalization applications 250 allow users of the networked system 102 to personalize various aspects of their interactions with the networked system 102. For example a user may, utilizing an appropriate one of the personalization applications 250, create a personalized reference page from which information regarding transactions to which the user is (or has been) a party, may be viewed. Further, the personalization applications 250 may enable a user to personalize listings and other aspects of their interactions with the networked system 102 and other parties outside of the networked system 102.

The networked system 102 may support a number of marketplaces that are customized, for example, to specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may, accordingly, include a number of internationalization applications 252 that customize information (and/or the presentation of information) by the networked system 102 according to predetermined criteria (e.g., geographic, demographic, or marketplace criteria). For example, the internationalization applications 252 may be used to support the customization of information for a number of regional websites that are operated by the networked system 102 and that are accessible via a respective web server 116, (see FIG. 1).

Navigation of the networked system 102 may be facilitated by one or more navigation applications 254. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the searching and browsing applications.

In order to make listings available via the networked system 102 as visually informing and attractive as possible, the marketplace applications 120 may include one or more imaging applications 256, which enable users to upload images for inclusion within listings. The imaging applications 256 also operate to incorporate images within viewed listings. The imaging applications 256 may also support one or more promotional features, such as image galleries that are presented to potential buyers. For example, sellers may pay an additional fee to have an image included within a gallery of images for promoted items.

Listing creation applications 258 allow sellers conveniently to author listings pertaining to goods or services that they wish to transact via the networked system 102, and listing management applications 260 allow sellers to manage such listings. Specifically, where a particular seller has authored and/or published a large number of listings, the management of such listings may present a challenge. The listing management applications 260 provide a number of features (e.g., auto-relisting, inventory level monitors, etc.) to assist the seller in managing such listings. One or more post-listing management applications 262 also assist sellers with a number of activities that typically occur post-listing. For example, upon completion of an auction facilitated by one or more auction applications 242, a seller may wish to leave feedback regarding a particular buyer. To this end, the post-listing management applications 262 may provide an interface to the reputation applications 248, so as to allow the seller conveniently to provide feedback regarding multiple buyers to the reputation applications 248.

Dispute resolution applications 264 provide mechanisms whereby disputes arising between transacting parties may be resolved. For example, the dispute resolution applications 264 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 266 implement fraud detection and prevention mechanisms to reduce the occurrence of fraud within the networked system 102.

Messaging applications 268 are responsible for the generation and delivery of messages to users of the networked system 102. Such messages include, for example, advising users regarding the status of listings at the networked system 102 (e.g., providing "outbid" notices to bidders during an auction process or to provide promotional and merchandising information to users). Respective ones of the messaging applications 268 may utilize any one of a number of message delivery networks and platforms to deliver messages to users. For example, the messaging applications 268 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 270 support various merchandising functions that are made available to sellers to enable sellers to increase sales via the networked system 102. The merchandising applications 270 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 272. For example, a buyer may earn loyalty or promotions points for each transaction established and/or concluded with a particular seller, and be offered a reward for which accumulated loyalty points can be redeemed.

Figure 3:
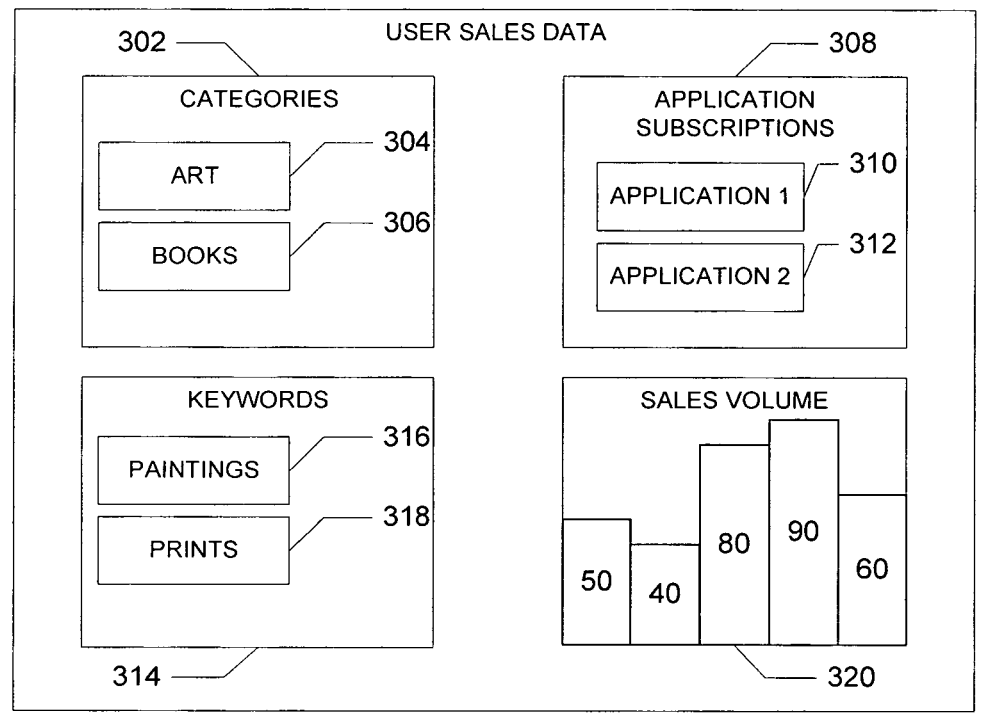
FIG. 3 is a block diagram illustrating sources of user sales data in an example embodiment.

FIG. 3 is a block diagram illustrating sources of user sales data 300 in an example embodiment. The user sales data 300 includes categories 302 in which the user has listed items for sale, such as the art category 304 or the books category 306. The user sales data 300 also includes the user's current application subscriptions 308, which may include application 1-310 and application 2-312. Keywords 314 are searchable descriptive terms associated with the user's listings, such as paintings 316 and prints 318. Additionally, the user sales data 300 includes sales volume statistics 320. These sales volume statistics 320 include total amount of items sold, items sold per month, items sold per year, etc. The user sales data 300 is one tool useful for user segmentation and user profiling, which consists of identifying similar types of users and treating them similarly.

Figure 4:
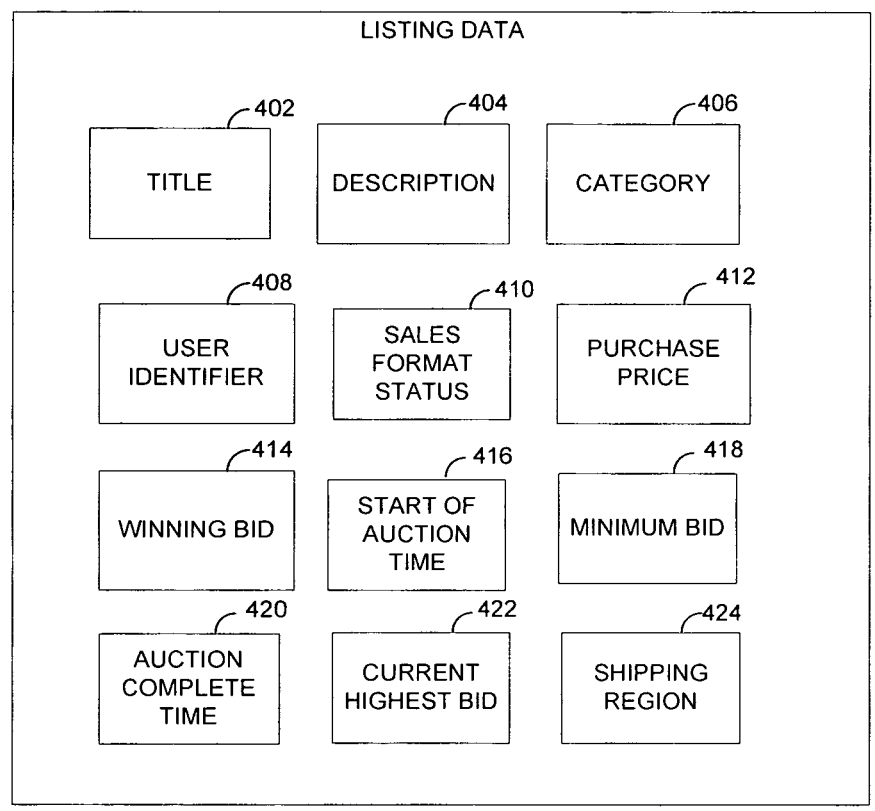
FIG. 4 is a block diagram illustrating pieces of listing data associated with an auction in one embodiment.

FIG. 4 is a block diagram illustrating pieces of listing data 400 associated with an auction or fixed sale of an item in one embodiment. The listing data 400 represents the item being sold and adds information that is used to compile statistics to calculate sales metrics and the user sales data 300. The listing data 400 includes a title 402 for the listing that is displayed to potential buyers as a summary of what the item is. The description 404 includes text and graphics that describe the item being sold and any instructions that the seller has, such as payment options, shipping costs, etc. The category 406 is the section of the online marketplace where the item is being sold. The category is useful for both searching for items and for compiling the user sales data 300. The user identifier 408 is a unique text string for each user on the marketplace that identifies who the seller is. Potential buyers can search for previous sales made by the same seller or contact the seller by knowing the user identifier 408. The sales format status 410 indicates whether the listing is a fixed price sale, a type of auction, or potentially both. Auctions include a start of auction time 416 that normally begins when a seller listings an item. However, sellers may also choose a start of auction time 416 in the future, which is useful for selling multiple items. Fixed priced sales have a purchase price 412 that a buyer must pay for the item, whereas auctions have a minimum bid 418. If a buyer places a bid on the item and no one outbids the buyer before the auction complete time 420, the buyer's bid is the winning bid 414 and the auction is complete. Potential buyers will see the current highest bid 422 when viewing the listing and may outbid the original buyer before the auction complete time 420. The shipping region 424 is where the seller is willing to ship an item and may also include shipping services and the item's origin.

Figure 5:
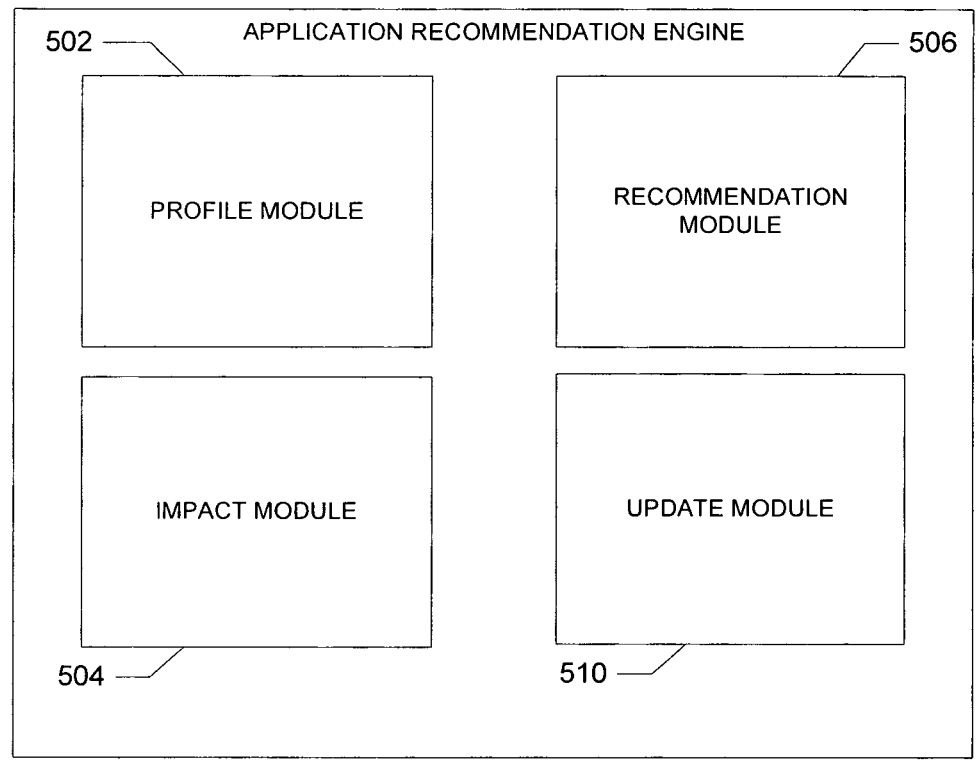
FIG. 5 is a block diagram illustrating component modules of a recommendation engine, according to an example embodiment.

FIG. 5 is a block diagram illustrating component modules of an application recommendation engine 132 (FIG. 1) according to an example embodiment. The application recommendation engine 132 includes a profile module 502 for calculating metrics and creating user sales profiles, an impact module 504 for assessing impacts on the metrics by applications, and a recommendation module 506 to recommend applications based on the impacts. The application recommendation engine 132 also includes an update module 510 for updating the listings with the recommended application.

Figure 6:
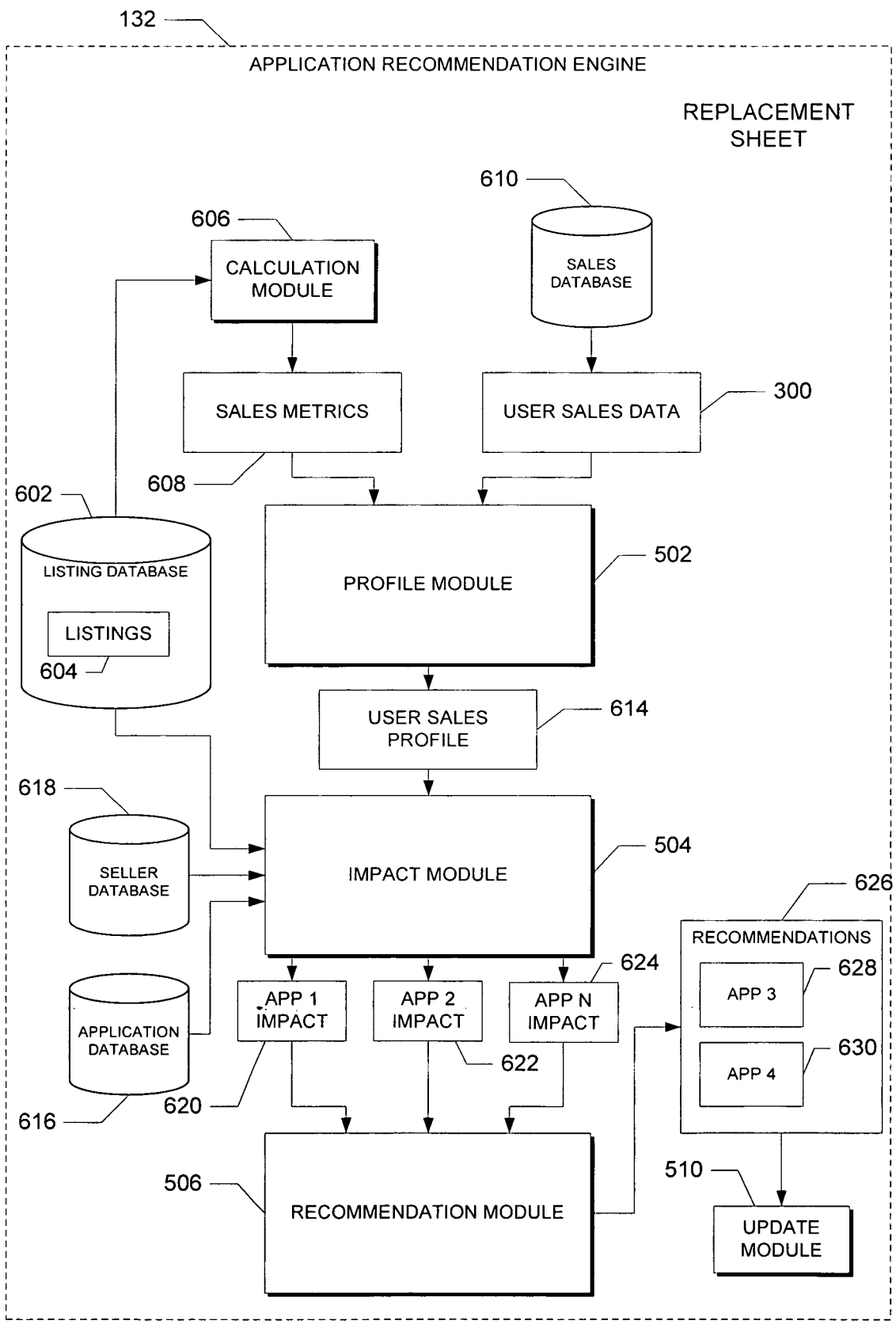
FIG. 6 is a block diagram illustrating an application recommendation engine, according to an example embodiment.

FIG. 6 is a block diagram illustrating the interaction between the modules of an application recommendation engine 132 (FIG. 1), according to an example embodiment. A user's listings 604 are retrieved from a listing database 602 and sent to a calculation module 606 to compute sales metrics 608. The sales metrics 608 include metrics such as profit margins, average selling prices, Detailed Seller Ratings (DSRs), feedback, inventory turnover rates, accuracy of listings, communication with customers, average time to delivery, and shipping charges. The user sales data 300 (see FIG. 3) is retrieved from a sales database 610. The profile module 502 (see FIG. 5) uses the sales metrics 608 and the user sales data 300 to create a user sales profile 614, which is fed into the impact module 504 (see FIG. 5). The impact module 504 also retrieves applications, seller information, and listings from an application database 616, a seller database 618, and the listing database 602 in order to calculate impacts on the sales metrics 608 for the applications. These impacts 620, 622, and 624 are used by the recommendation module 506 (see FIG. 5) to determine one or more recommendations 626 for the user, such as application 3 628 and application 4 630. The recommendations 626 are communicated to the user, and the user has a choice of adding the application(s) or not. If an application is chosen, the update module 510 (see FIG. 5) is responsible for updating the user's listings 604 with the application.

Figure 7:
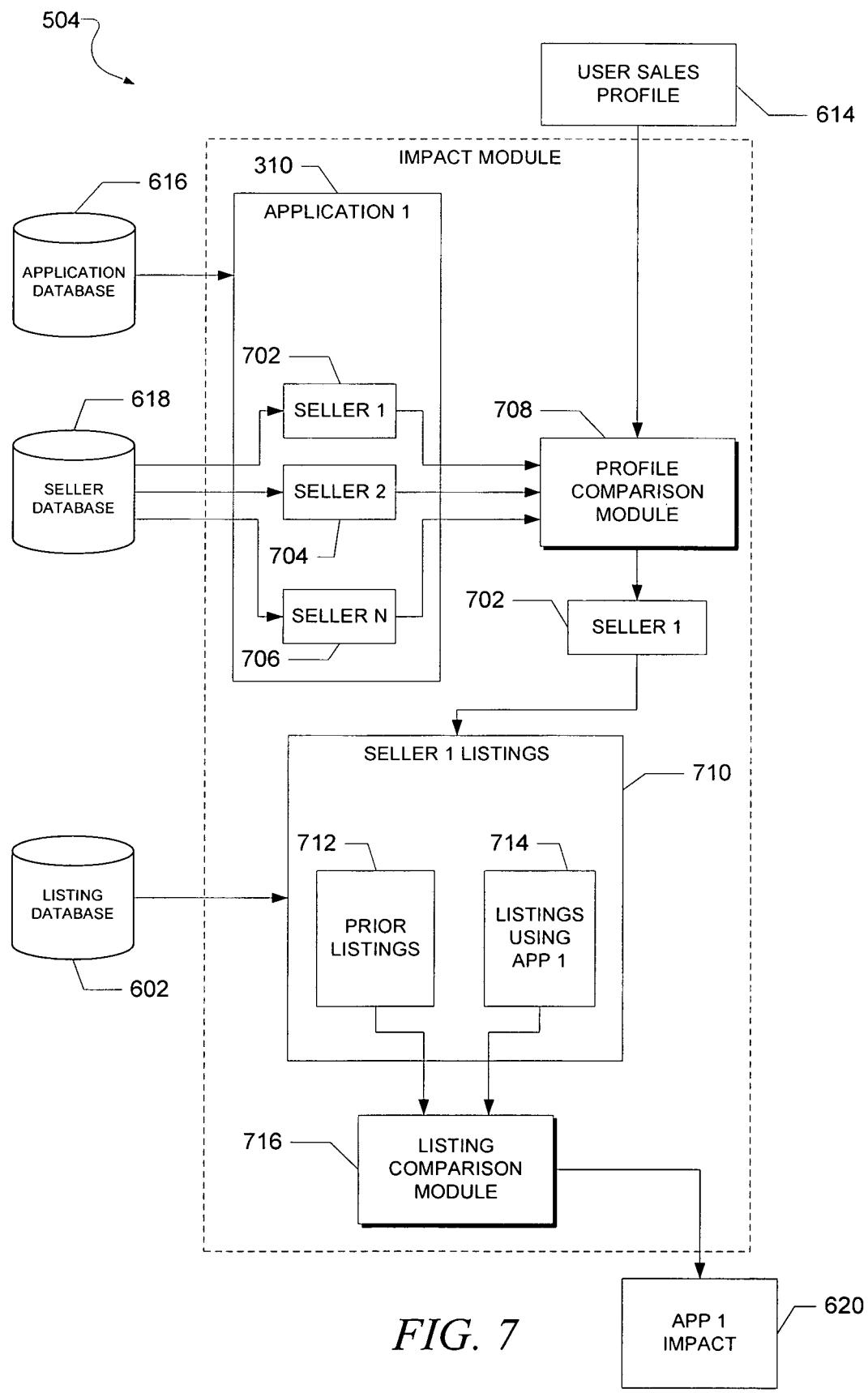
FIG. 7 is a block diagram illustrating an impact module of an application recommendation engine, according to one embodiment.

FIG. 7 is a block diagram illustrating the impact module 504 (see FIG. 5) of the application recommendation engine 132 (see FIG. 1), according to an example embodiment. For each application 310 (see FIG. 3) retrieved from the application database 616, the profile comparison module 708 retrieves seller predetermined profiles 702, 704, and 706 from the seller database 618 and compares the predetermined profiles with the user sales profile 614. For each of the sellers 702, 704, and 706 with a similar profile to the user in question, the seller's associated listings are retrieved from the listing database 602. For example, if the profile of the first seller is similar to the profile of the user, the first seller listings are retrieved from the listing database 602 in the seller 1 listing block 710. The seller's prior listings 712 and listings using the application in question 714 are compared by the listing comparison module 716, which results in an impact 620 for that application.

Figure 8:
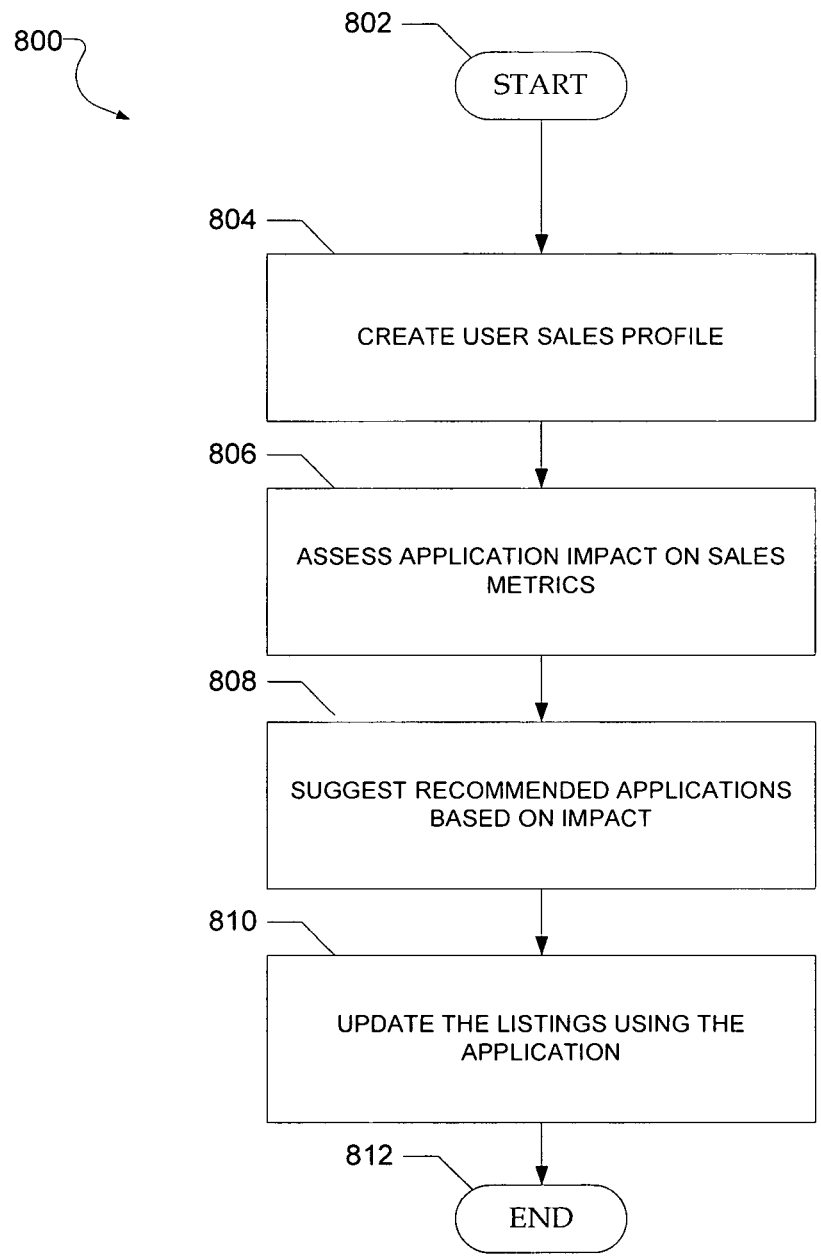
FIG. 8 is a flow chart of a method of recommending applications according to various example embodiments.

FIG. 8 is a flow chart of a method 800 of recommending applications according to some example embodiments. While operations of the method 800 are described below as being performed by specific components, modules, or systems of the client-server system 100 (see FIG. 1), it will be appreciated that these operations need not necessarily be performed by the specific components identified, and could be performed by a variety of components and modules, potentially distributed over a number of machines. Alternatively, at least certain ones of the variety of components and modules described herein can be arranged within a single hardware, software, or firmware component.

The method 800 commences at operation 802 and proceeds to operation 804, where in an example embodiment, a user sales profile is created by combining user sales data 300 (see FIG. 3) and sales metrics 608 from listings 604 (see FIG. 6) related to a user. At operation 806, impacts on the sales metrics 608 are assessed for a portion of the applications to determine which applications may have the most positive impact on the user, at least one of which is suggested at operation 808. If the user chooses to add one of the chosen applications, the user's listings 604 are updated with the application at operation 810. The method 800 ends at operation 812.

Figure 9:
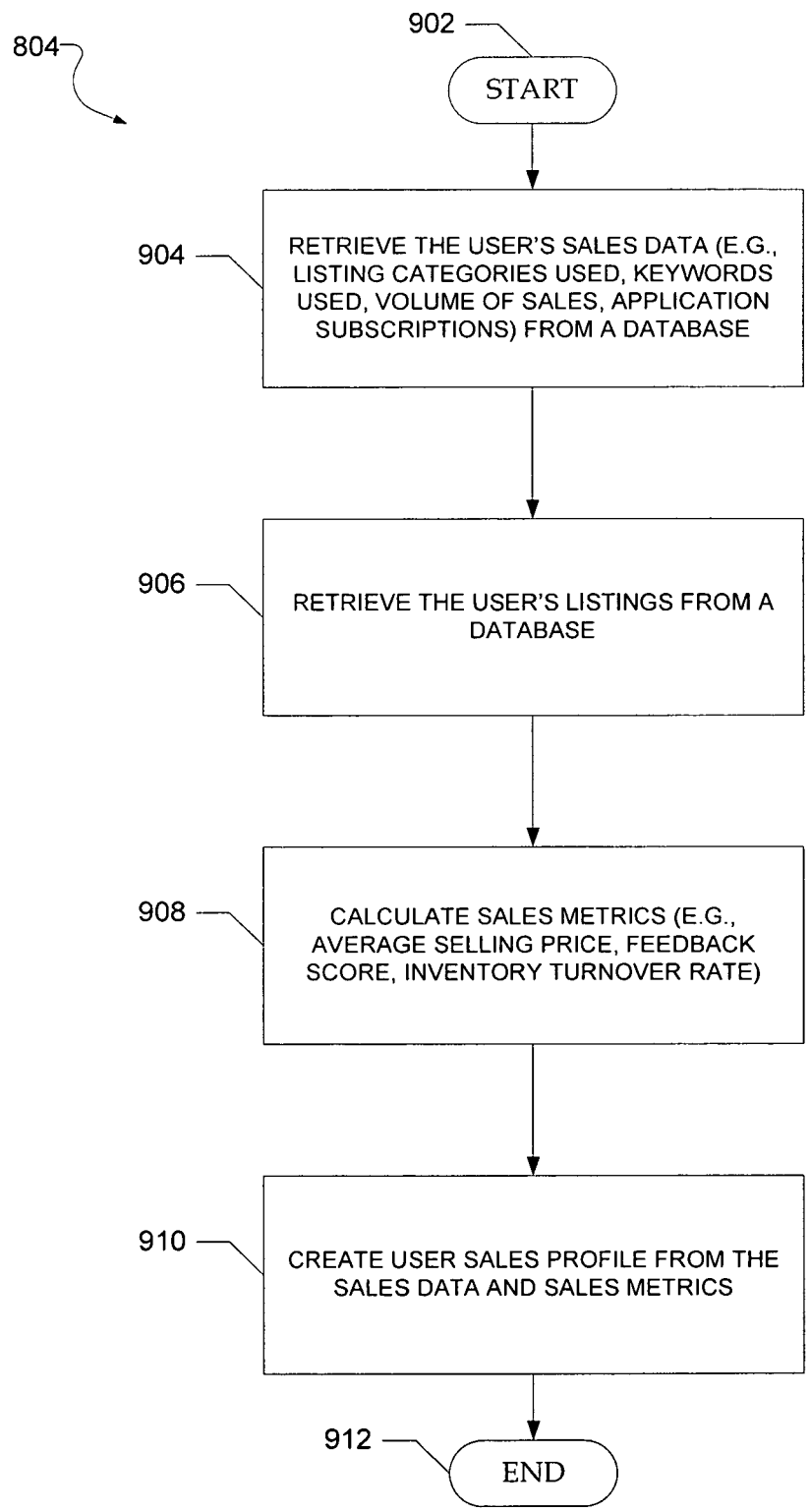
FIG. 9 is a flow chart of a method of profiling users from user sales data and listings in one example embodiment.

FIG. 9 is a detailed flow chart of operation 804 (see FIG. 8), in one embodiment, of profiling users from user sales data 300 (see FIG. 3) and listings 604 (see FIG. 6). The detailed operation 804 commences at operation 902 and proceeds to operation 904 where the user sales data 300 are retrieved from the sales database 610 (see FIG. 6). At operation 906, the user's listings 604 are retrieved from the listing database 602 (see FIG. 6). Using the listings 604, current values of the sales metrics 608 (see FIG. 6) for the user are calculated to determine which areas a user can improve in order to maximize sales potential (operation 908). Some of the sales metrics 608 are calculated using standard statistical functions such as simple linear regression or correlations applied to the relevant data. Other metrics, such as the DSR, already have fixed values assigned based on the seller's listing history. At operation 910, the user sales data 300 and sales metrics 608 are combined to form a user sales profile. The method of creating a user sales profile ends at operation 912.

Figure 10:
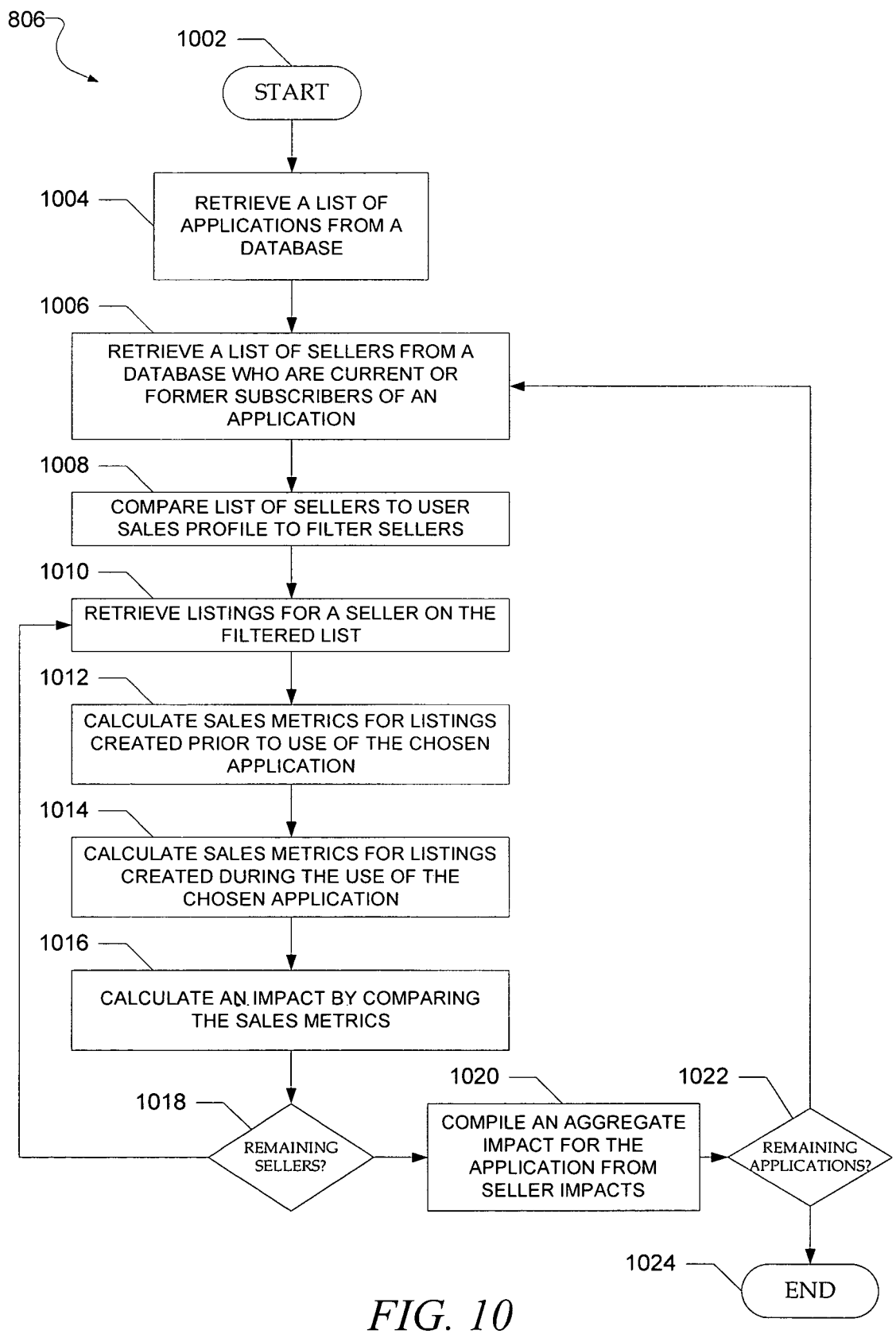
FIG. 10 is a flow chart of a method of determining the impact an application will have on a user's sales, according to an example embodiment.

FIG. 10 is a detailed flow chart of operation 806 (see FIG. 8), according to an example embodiment, of determining the impact applications will have on a user's sales. The relative performance of an individual user is measured against the average performance indices for comparable sellers in terms of user sales data 300, and the difference before and after adoption of the given application is calculated. The absolute performance of an individual user is measured by calculating the weighted-average, before and after adoption of the application, across all sellers who use the given application. In an example embodiment, the impact includes both a relative performance impact and an absolute performance impact.

The detailed operation 806 commences at operation 1002 and proceeds to operation 1004 where a list of applications is retrieved from the application database 616 (see FIG. 6). These applications may be the third party application 128 (see FIG. 1) hosted on third party servers 130 (see FIG. 1), or they may be marketplace applications 120 (see FIG. 2) hosted within the networked system 102 (see FIG. 1). Example applications may help a user manage large numbers of pending auctions, track expenses and profits, create a loyalty program, or automate shipping. In one example embodiment, a list of all applications within the client-server system 100 is retrieved from the application database 616. Alternatively, the list may include only applications that match a user's preferences or meet other criteria, such as having a high rating. For example, a user may only desire applications to improve shipping so only applications related to shipping would be retrieved from the application database 616.

In one example embodiment, application explicit ratings are determined by user surveys before and after subscribing to an application. Before subscription, users indicate why they are subscribing to a particular application (measuring expectations) and after a period of time, the users are again surveyed to determine whether their expectations are satisfied. Each application receives a rating based on how well it meets expectations. Sellers may also rate other aspects of the application such as "ease of use," "reliability," and "availability of customer support." Additionally, the percentage of sellers who renew their subscription to a given application is stored as the application implicit rating. Finally, an editor with access to the system assigns an editor rating to each application based on one or more the following criteria: security and privacy, availability of infrastructure, quality of customer service, ease of use, software quality, and value.

For each application on the list, the impact module 504 (see FIG. 5) retrieves a list of sellers and the sellers' profiles from the seller database 618 who are current or former subscribers of the application (operation 1006). At operation 1008, the profiles of the retrieved sellers are compared to the user sales profile in order to generate a filtered list of sellers who have profiles similar to the user. Similarity is determined by matching user sales data 300 (see FIG. 3) and weighing the differences between the sales metrics 608 (see FIG. 6). At operation 1010, for each seller on the filtered list, the seller's listings are retrieved from the listing database 602 (see FIG. 6) and divided into two relevant categories: the prior listings 712 (see FIG. 7) created before the use of the application and listings using the application in question 714 (see FIG. 7). In some embodiments, these listings may be further filtered by user sales data 300 such as categories 302 or keywords 314 (both shown in FIG. 3) in order to only compare the most relevant listings. Also, only listings created during a specific time frame may be chosen to avoid using stale data.

At operation 1012, sales metrics for the prior listings 712 are calculated, and at operation 1014, sales metrics for listings using the application in question 714 are calculated. The listing comparison module 716 (see FIG. 7) computes the impact for that seller by comparing the difference between the seller's sales metrics for the set of prior listings 712 and the set of listings using the application in question 714 (operation 1016). At decision 1018, a determination is made whether there are any remaining sellers on the filtered list, and operations 1010 through 1016 are repeated if so. If not, an aggregate impact for the application is compiled from all the sellers' impacts. A determination is made whether there are remaining applications in the list of applications. If so, operations 1006 through 1020 are repeated. The method of determining the impact applications will have on a user's sales ends at operation 1024.

Figure 11:
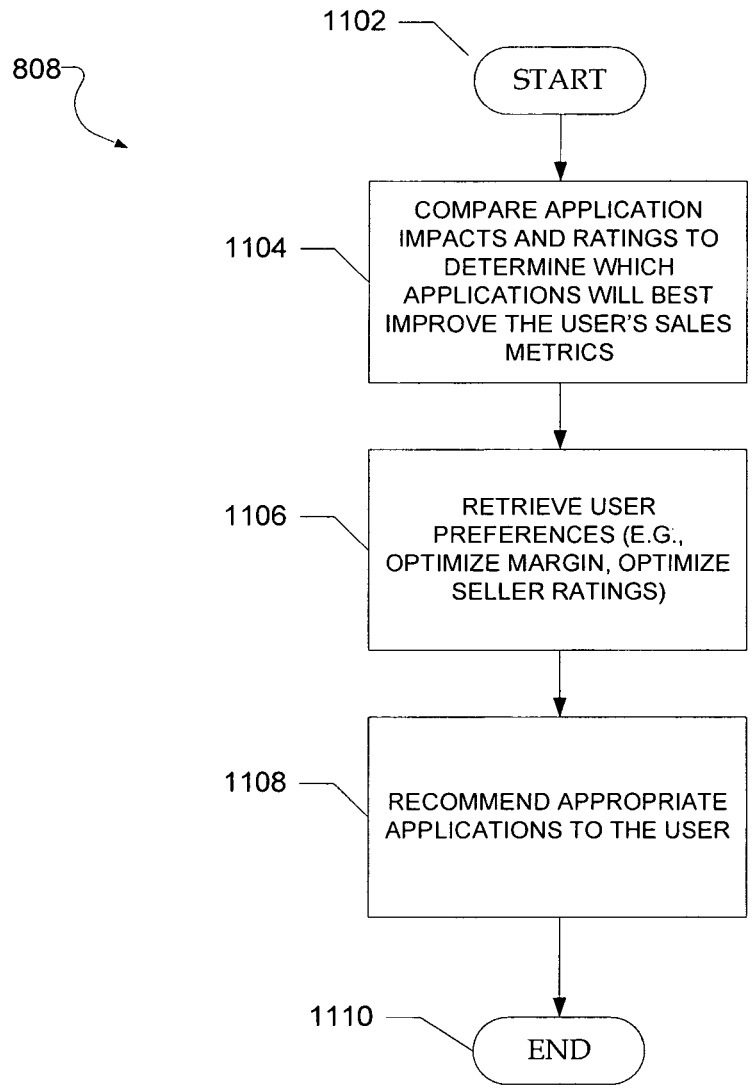
FIG. 11 is a flow chart of a method of recommending an application to a user after impacts have been determined, according to an embodiment.

FIG. 11 is a detailed flow chart of operation 808 (see FIG. 8), according to one embodiment, of recommending an application to a user after impacts have been determined. The detailed operation 808 begins at operation 1102 and proceeds to operation 1104 where the application impacts 620, 622, and 624 (each shown in FIG. 6) and the ratings are compared to determine which applications will best improve the user's sales metrics. The absolute performance impacts, relative performance impacts, explicit rating, implicit rating, and editor rating are normalized and sent to a rating function R, which outputs a recommendation score for each application.

At operation 1106, a user's preferences are retrieved in order to refine the recommendation process. For example, a user may be more concerned with improving profit margins or detailed seller ratings, whereas another user may care more about increasing sales volume. At operation 1108, the user preferences are applied to the recommendation scores to recommend the best applications to the user. The best applications are the ones with the greatest positive recommendation score in areas that the user prefers to improve. The method of recommending applications ends at operation 1110.

FIG. 12 is an image of an application recommended to a user within a user interface in an example embodiment. In this example, a user which has sold 10,000 items is being recommended the terapeak marketplace research application in order to get up to date information about inventory value, increase sales, and boost profits. For this application to be recommended, other sellers with similar user sales data 300 (see FIG. 3) and sales metrics to the current user improved their sales and profits with terapeak.

Example Machine Architecture and Machine-Readable Medium

Figure 13:
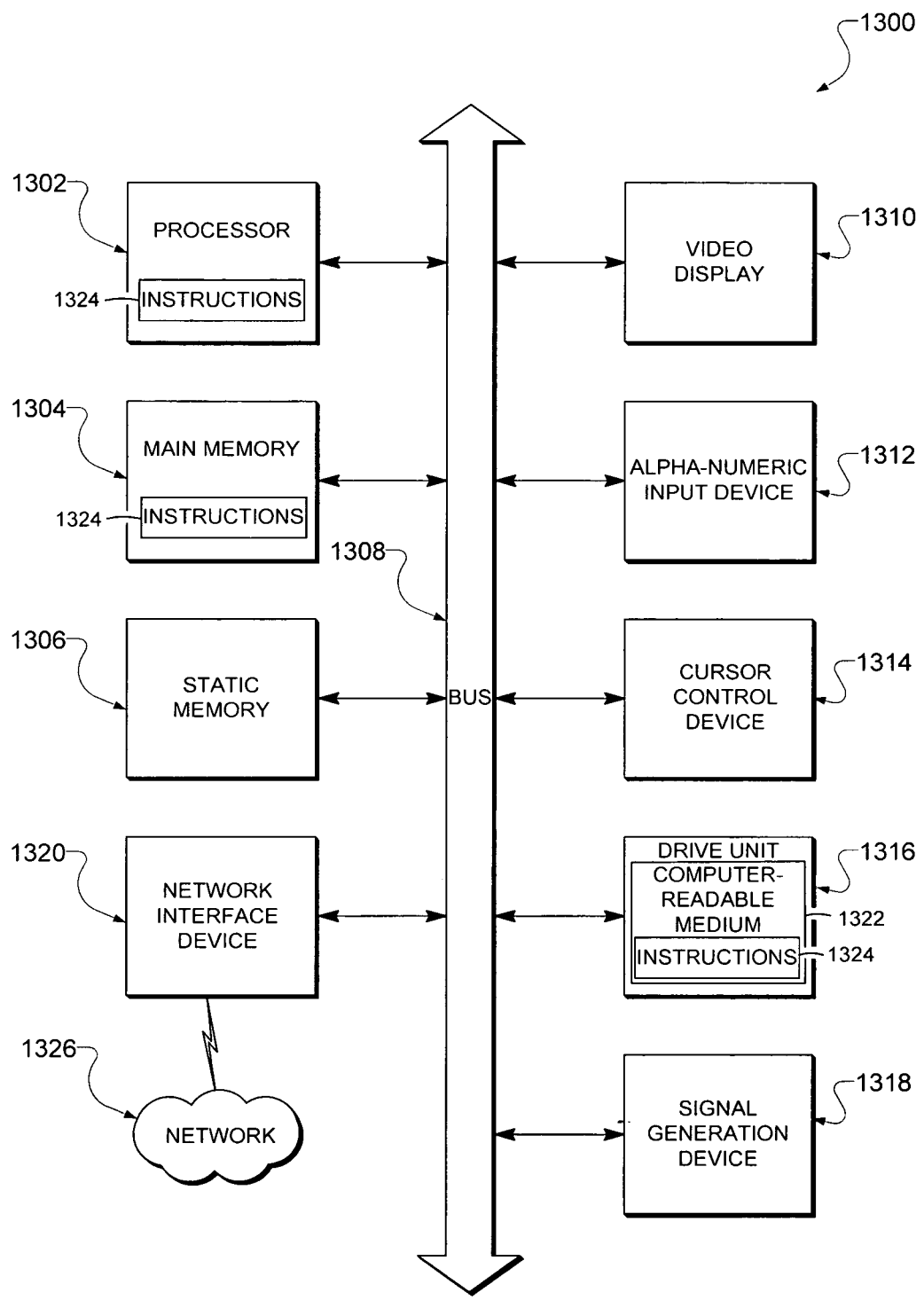
FIG. 13 is a diagrammatic representation of a machine in the example form of a computer system within which set instructions for causing the machine to perform any one or more of the methodologies discussed herein may be executed.

FIG. 13 is a diagrammatic representation of a machine in the example form of a computer system 1300 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or client devices in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation device 1314 (e.g., a mouse), a disk drive unit 1316, a signal generation device 1318 (e.g., a speaker) and a network interface device 1320.

Machine-Readable Medium

The disk drive unit 1316 includes a machine-readable medium 1322 on which is stored one or more sets of instructions 1324 and data structures (e.g., software) embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., Hypertext Transfer Protocol (HTTP)). Examples of communication networks include a local area network (LAN), a wide area network (WAN), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Modules, Components, and Logic

Certain embodiments are described herein as including logic or a number of components, modules, or mechanisms. A component is a tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software), may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation and store the output of that operation in a memory device to which it is communicatively coupled. A further component may then, at a later time, access the memory device to retrieve and process the stored output. Components may also initiate communications with input or output devices, and can operate on a resource (e.g., a collection of information).

Although certain specific example embodiments are described herein, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments are described and illustrated in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A system comprising:
one or more modules implemented by one or more processors of a network-based marketplace system, the one or more modules incorporated into the network-based marketplace system to configure the network-based marketplace system to, at least:
create an online marketplace sales profile for a seller for maintaining in one or more databases, the creating including calculating a plurality of metrics for the seller corresponding to a plurality of online listings, the plurality of metrics for the seller including sales metrics for the sale items;
identify other sellers similar to the seller by comparing the online marketplace sales profile for the seller in the one or more databases to online marketplace sales profiles for the other sellers in the one or more databases, the online marketplace sales profiles for the other sellers including a plurality of metrics corresponding to a plurality of listings of other sale items stored in the one or more databases and posted on the network-based trading environment by the other sellers, the plurality of metrics for the other sellers including a plurality of sales metrics for the other sale items;
for each of a plurality of online applications used by the other sellers, assess a performance impact by the online application on the plurality of metrics for the other sellers after a subscription by the other sellers to the online application;
select one application from the plurality of the online applications as a recommendation for the seller based on a rating of the application, the rating including a function of the impact by the online application on the plurality of metrics for the other sellers;
allow the seller to accept the recommendation via a user interface presented on a device of the seller, the accepting allowing the seller to subscribe to the application without having to search for the application or without a writer of the application having to advertise the application; and
automatically update at least a portion of the plurality of listings of the sale items based on an acceptance by the seller of the recommendation.

2. The system of claim 1, wherein the one or more modules are further configured to:
calculate the performance impact on the plurality of metrics for the other sellers after the subscription by the sellers to the online application by calculating a prior metric of the plurality of metrics for the other sellers for a first set of listings of the plurality of listings related to the other sellers, the first set of listings related to a first seller of the other sellers prior to use of the online application, calculating an updated metric for a second set of listings, the second set of listings related to the first seller during the use of the online application, and comparing the updated metric to the prior metric.

3. The system of claim 1, wherein the sales profile for the seller also includes sales data for the sale items, the sales data including listing categories, listing keywords, application subscriptions, and a volume of sales.

4. The system of claim 1, wherein the plurality of metrics also includes at least one of profit margins, an average selling price, Detailed Seller Ratings (DSRs) and feedback, inventory turnover rate, accuracy of listings, communication with customers, average time to delivery, or shipping charges.

5. The system of claim 1, wherein the application is one of a plurality of online business applications available to be recommended to the seller for automatically updating at least portions of the listings of the sale items to improve an effectiveness of the seller at selling the sale items on the network-based marketplace system.

6. The system of claim 1, wherein the rating also includes a function of an application explicit rating, an application implicit rating, and an editor rating.

7. The system of claim 1, wherein the one or more modules are further configured to refine the rating based on user preferences.

8. The system of claim 1, the one or more modules further configured to rank the online application against a plurality of other online applications based on the rating and other ratings, the other ratings including a function of the impact by the other applications on the plurality of metrics for the other sellers.

9. A method comprising:
creating an online marketplace sales profile for a seller for maintaining in one or more online databases, the creating including calculating a plurality of metrics corresponding to a plurality of online listings of sale items stored in the one or more databases of a network-based marketplace system and posted on the network-based marketplace system by the seller, the plurality of metrics for the seller including sales metrics for the sale items;
identifying other sellers similar to the seller by comparing the online marketplace sales profile for the seller in the one or more databases to online marketplace sales profiles for the other sellers in the one or more databases, the online marketplace sales profiles for the other sellers including a plurality of metrics corresponding to a plurality of listings of other sale items stored in the one or more databases and posted on the network-based trading environment by the other sellers, the plurality of metrics for the other sellers including a plurality of sales metrics for the other sale items;

for each of a plurality of online applications used by the other sellers, assessing a performance impact by an online application on the plurality of metrics for the other sellers after a subscription by the other sellers to the online application;

selecting one application from the plurality of the online applications as a recommendation for the seller based on a rating of the application, the rating including a function of the impact by the online application on the plurality of metrics for the other sellers;

allowing the seller to accept the recommendation via a user interface presented on a device of the seller, the accepting allowing the seller to subscribe to the application without having to search for the application or without a writer of the application having to advertise the application; and automatically updating at least a portion of the plurality of listings based on an acceptance by the seller of the recommendation, one or more modules incorporated into the network-based marketplace system to configure the network-based marketplace system to perform the creating, identifying, assessing, providing, and updating, the one or modules implemented by one or more processors of the network-based marketplace system.

10. The method of claim 9, further comprising:

calculating the performance impact on the plurality of metrics for the other sellers after the subscription by the sellers to the online application by calculating a prior metric of the plurality of metrics for the other sellers for a first set of listings of the plurality of listings related to the other sellers, the first set of listings related to a first seller of the other sellers prior to use of the online application, calculating an updated metric for a second set of listings, the second set of listings related to the first seller during the use of the online application, and comparing the updated metric to the prior metric.

11. The method of claim 9, wherein the sales profile for the seller also includes sales data for the sale items, the sales data including listing categories, listing keywords, application subscriptions, and a volume of sales.

12. The method of claim 9, wherein the plurality of metrics also includes at least one of profit margins, an average selling price, Detailed Seller Ratings (DSRs) and feedback, inventory turnover rate, accuracy of listings, communication with customers, average time to delivery, or shipping charges.

13. The method of claim 9, wherein the application is one of a plurality of online business applications available to be recommended to the seller for automatically updating at least portions of the listings of the sale items to improve an effectiveness of the seller at selling the sale items on the network-based marketplace system.

14. The method of claim 9, wherein the rating also includes a function of an application explicit rating, an application implicit rating, and an editor rating.

15. The method of claim 9, wherein the one or more modules are further configured to refine the rating based on user preferences.

16. The method of claim 9, the one or more modules further configured to rank the online application against a plurality of other online applications based on the rating and other ratings, the other ratings including a function of the impact by the other applications on the plurality of metrics for the other sellers.

17. A non-transitory machine-readable storage medium comprising a set of instructions that, when executed by one or more processors, cause the one or more processors to perform operations, the operations comprising:

creating an online marketplace sales profile for a seller for maintaining in one or more online databases, the creating including calculating a plurality of metrics corresponding to a plurality of online listings of sale items stored in the one or more databases of a network-based marketplace system and posted on the network-based marketplace system by the seller, the plurality of metrics for the seller including sales metrics for the sale items;

identifying other sellers similar to the seller by comparing the online marketplace sales profile for the seller in the one or more databases to online marketplace sales profiles for the other sellers in the one or more databases, the online marketplace sales profiles for the other sellers including a plurality of metrics corresponding to a plurality of listings of other sale items stored in the one or more databases and posted on the network-based trading environment by the other sellers, the plurality of metrics for the other sellers including a plurality of sales metrics for the other sale items;

for each of a plurality of online applications used by the other sellers, assessing a performance impact by an online application on the plurality of metrics for the other sellers after a subscription by the other sellers to the online application;

selecting one application from the plurality of the online applications as a recommendation for the seller based on a rating of the application, the rating including a function of the impact by the online application on the plurality of metrics for the other sellers;

allowing the seller to accept the recommendation via a user interface presented on a device of the seller, the accepting allowing the seller to subscribe to the application without having to search for the application or without a writer of the application having to advertise the application; and automatically updating at least a portion of the plurality of listings based on an acceptance by the seller of the recommendation, one or more modules incorporated into the network-based marketplace system to configure the network-based marketplace system to perform the creating, identifying, assessing, providing, and updating, the one or modules implemented by one or more processors of the network-based marketplace system.

18. The non-transitory machine-readable medium of claim 17, the operations further comprising calculating the performance impact on the plurality of metrics for the other sellers after the subscription by the sellers to the online application by calculating a prior metric of the plurality of metrics for the other sellers for a first set of listings of the plurality of listings related to the other sellers, the first set of listings related to a first seller of the other sellers prior to use of the online application, calculating an updated metric for a second set of listings, the second set of listings related to the first seller during the use of the online application, and comparing the updated metric to the prior metric.

* * * * *

UNITED STATES PATENT AND TRADEMARK OFFICE
CERTIFICATE OF CORRECTION

PATENT NO. : 10,984,397 B2
APPLICATION NO. : 12/416051
DATED : April 20, 2021
INVENTOR(S) : Farhang Kassaei It is certified that error appears in the above-identified patent and that said Letters Patent is hereby corrected as shown below:

In the Claims

In Column 16, Line 52, in Claim 18, delete "medium" and insert -- storage medium --, therefor.

Signed and Sealed this
Twentieth Day of July, 2021

Drew Hirshfeld
*Performing the Functions and Duties of the
Under Secretary of Commerce for Intellectual Property and
Director of the United States Patent and Trademark Office*